United States Patent [19]

Schuster et al.

[11] Patent Number: 4,728,011
[45] Date of Patent: Mar. 1, 1988

[54] METERING STOPPER

[75] Inventors: Wilhelm Schuster; Fritz Deak, both of Frankfurt am Main, Fed. Rep. of Germany

[73] Assignee: AHK Alkohol Handelskontor GmbH & Co. KG, Fed. Rep. of Germany

[21] Appl. No.: 886,893

[22] Filed: Jul. 18, 1986

[30] Foreign Application Priority Data

Jul. 19, 1985 [DE] Fed. Rep. of Germany ....... 3525814
Jun. 19, 1986 [EP] European Pat. Off. ........ 86108369.9

[51] Int. Cl.⁴ ................................. G01F 11/28
[52] U.S. Cl. .................................. 222/439; 222/456; 222/440; 222/453
[58] Field of Search ............... 222/425, 434, 438–440, 222/453, 454, 456, 510, 559

[56] References Cited

U.S. PATENT DOCUMENTS

| 2,722,345 | 11/1955 | Van Buren | 222/440 |
| 4,109,829 | 8/1978 | Kuckens et al. | 222/453 |
| 4,474,312 | 10/1984 | Dopoghue | 222/438 |
| 4,496,078 | 6/1985 | Nelzow et al. | 222/439 |
| 4,533,070 | 8/1985 | Deininger et al. | 222/439 |

FOREIGN PATENT DOCUMENTS 2710626 9/1978 Fed. Rep. of Germany .
6617452 6/1968 Netherlands ......................... 222/425

Primary Examiner—H. Grant Skaggs
Attorney, Agent, or Firm—Franklin D. Wolffe; Morris Fidelman

[57] ABSTRACT

A metering stopper for the neck of a bottle is described, with which a liquid medium is delivered in metered quantities. A tubular metering housing encloses a metering chamber which is provided with an outlet bore, the wall of which metering chamber has recesses for the admission of liquid into the inside of the metering chamber and in which a float is inserted which slides in sealing manner along the inner wall of the metering chamber. The float, the specific weight of which is in each case greater than the specific weight of the liquid to be delivered, has a cone, the tapered tip of which interacts with a valve seat in the outlet bore of the metering chamer. When the bottle is tilted, liquid enters through the recesses in the wall of the metering chamber and, as soon as the metering space of the latter is filled with liquid, the float, when the liquid is flowing out through the outlet bore, moves downwards towards this outlet, and the cone closes the valve seat as soon as the metered liquid quantity has flowed out. By varying the displacement of the float in the metering chamber, the liquid quantity to be delivered can be selected as desired.

6 Claims, 7 Drawing Figures

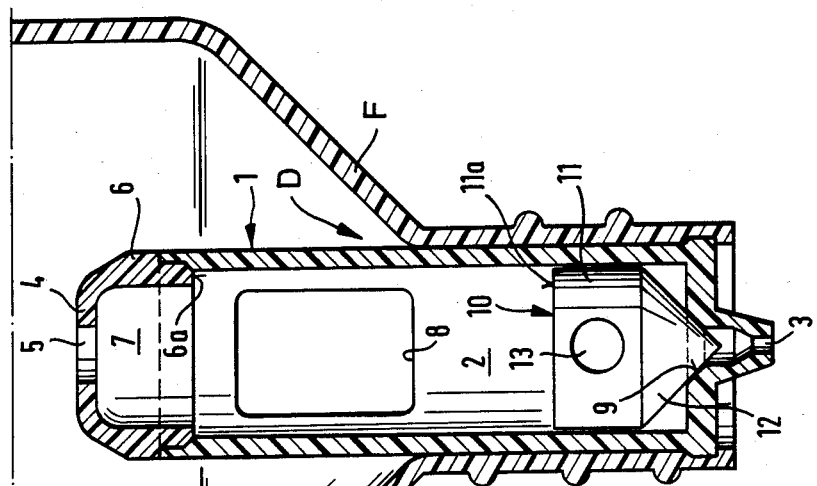
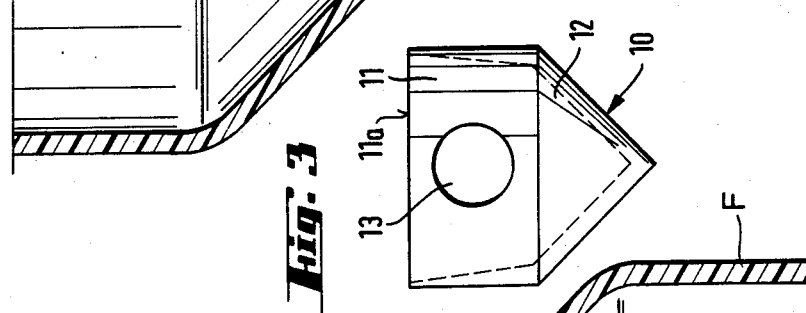
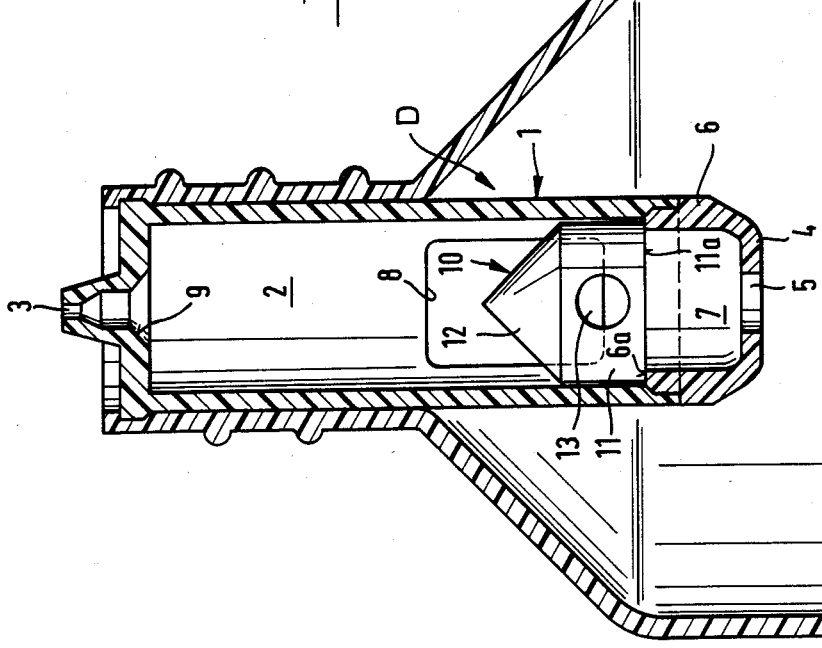

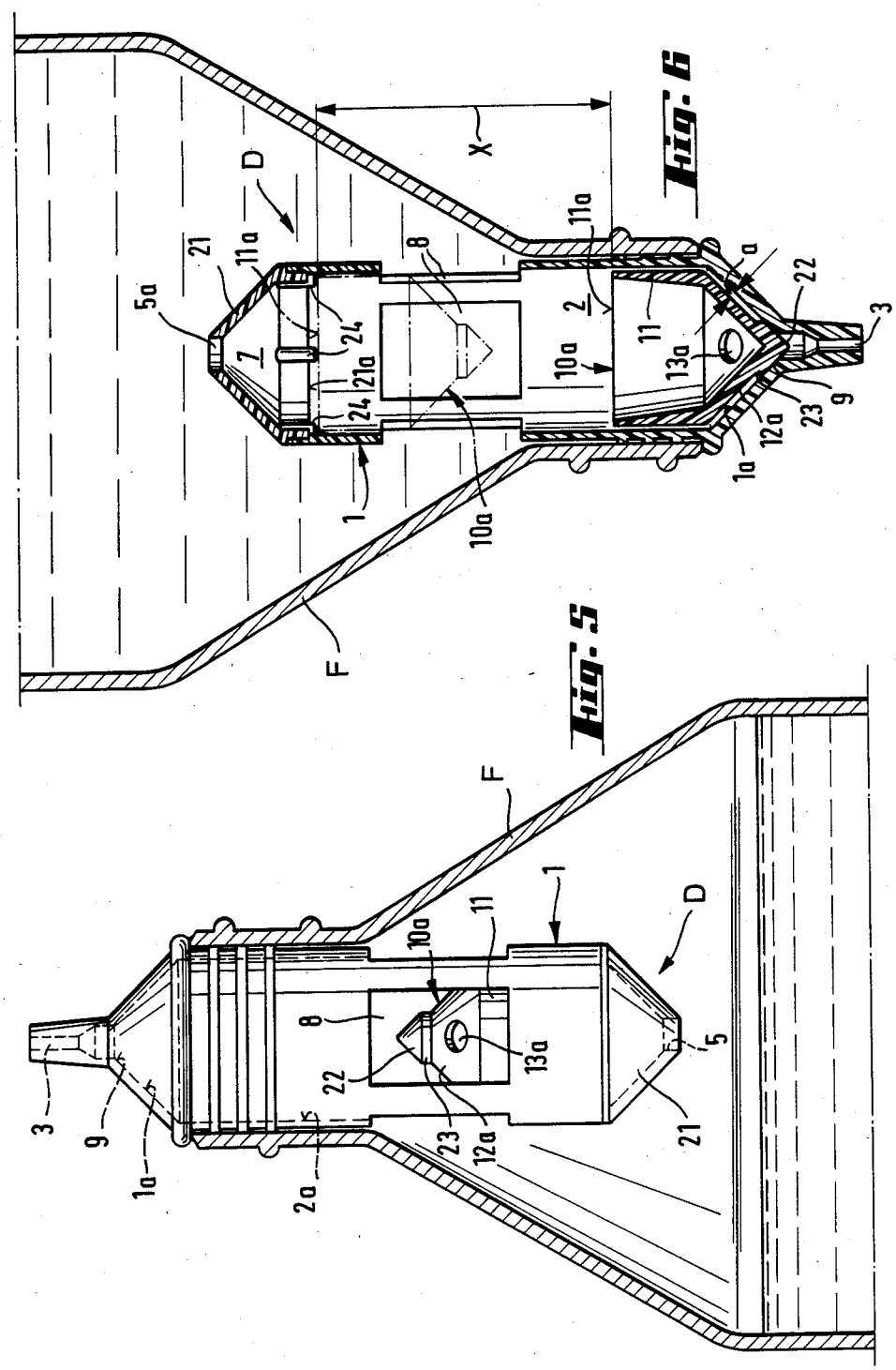

METERING STOPPER

BACKGROUND OF THE INVENTION

The invention relates to a metering stopper for the neck of a bottle for the metered delivery of a liquid medium, in which a tubular metering housing is provided which encloses a metering chamber and which has an outlet bore for the medium in its front face and, in the wall, has recesses for the filling of the metering chamber, and a float having a lateral flooding bore is inserted in the metering chamber, the density of which float is greater than that of the medium to be delivered and of which the end facing towards the outlet bore interacts with a valve seat allocated to this outlet bore.

Such a metering appliance is known from German Offenlegungsschrift No. 2,710,626. A float with numerous holes is inserted at the periphery in a cylindrical housing having recesses and a sealing bevel provided for a large pouring opening. A slight bevel is provided on the wall of the float end facing towards the pouring opening, which bevel fits the sealing bevel on the housing. Undoubtedly, by means of the hollow float which can move freely in a flooded metering chamber, the intention here is to block the outflow of the medium to be metered until the metering chamber is filled. However, bubble-free filling, which is essential for accurate metering, is not possible with this known metering appliance. The medium also flows out uncontrolled.

The same applies to other known metering devices. In the metering device described in German Patent Specification No. 1,202,672, a collecting space, a metering space and a receiving space are provided in the metering chamber. The volume of the collecting space is at least as large as the volume of the liquid quantity to be metered, the volume of the metering space is as large as the volume of the liquid quantity to be metered and the volume of the receiving space is at least as large as half the maximum amount of free liquid arising. Although only certain liquid quantities are always delivered from such a device, the metering accuracy leaves something to be desired and considerable differences occur in the liquid quantities actually flowing out.

In German Utility Model No. 7,810,073, a metering stopper is described in which a ball valve is provided which is set in motion by tilting the bottle to and fro and is alternately to open or close the inlet and outlet openings of a metering chamber. Yet even in this embodiment, the metering accuracy is inadequate and very unreliable.

A further embodiment of a metering device can be gathered from the German Utility Model No. 8,411,429, in which a slide, which can be pushed in axially and has springs provided its periphery, which springs are supported on the metering chamber base, is guided through the metering chamber. In the normal position of the slide, the springs do not sit on the metering chamber base, so that through-flow openings in the metering chamber base are fully open. At the same time, a stopper part coupled to the slide closes an outlet opening of the metering chamber. When the slide is pushed into the metering chamber, the outlet opening is cleared and at the same time the springs come into contact with the metering chamber base and close the through-flow openings. If the slide is only pushed in slightly, a certain part of the through-flow openings remain free, so that an any liquid quantity can be removed from the container. The degree of metering accuracy therefore depends on the manipulation by the user and, moreover, a metering device of several individual parts, some of which must fit very accurately, is required in this embodiment.

In all these known metering devices, the particular disadvantage is the insufficient metering accuracy, and variations of up to almost 75% are measured. At the same time, metering becomes increasingly less accurate the less liquid there is in the bottle or container.

The object of the invention is to create a metering stopper of the type mentioned at the beginning, with which the liquid medium is metered in an exceptionally accurate manner until the bottle is emptied down to the last few drops.

This object is achieved by the metering stopper of the type mentioned at the beginning, when the open end of the metering housing and therefore of the metering chamber, which end is located opposite the outlet bore, is closed by a sealing cap which has a vent bore which, in the assembled metering stopper, is in alignment with the outlet bore of the metering housing, the float consists of a hollow body open on one side and having a cylindrical part and, integrally formed thereon, a tapered cone, the tip of which fits the valve seat as a sealing taper, and a flooding bore is cut out in the wall of the cylindrical part or in the wall of the cone.

Expedient further embodiments of the metering stopper are characterized in the subclaims.

SUMMARY OF THE INVENTION

In its basic form, the metering stopper consists of three components, namely a tubular metering housing, enclosing the metering chamber, a sealing cap and a float inserted into the metering chamber. The metering stopper is inserted in liquid-tight manner into a bottleneck in such a way that about half the tubular metering housing projects into the inside of the bottle. For removing the liquid, the bottle is held with the mouth downwards, whereupon liquid flows into the metering chamber. The float designed according to the invention maintains buoyancy until the air is displaced out of the metering chamber. In this way, the metering chamber is filled with bubble-free liquid. The float, together with the liquid running out, then sinks into the metering chamber. When the metering-housing front wall is reached in which the out-let bore is provided, the tapered tip of the cone of the float slides into the corresponding inversely tapered valve seat of the outlet bore and reliable seals the latter.

The metering accuracy of such a metering stopper is exceptionally high and measurements have shown only negligible variations for various settings. This result is important in particular where the use of substances is concerned which are to be used only in an amount which is metered as accurately as possible, for example pesticides, fertilizer and the like. The accurate matching of the mutually complementary components of the metering housing and the float not only ensures perfect sealing but prevents the float from sticking. A further advantage of the metering stopper according to the invention is that, when delivering substances which are not harmless to man, the user's hand does not come in contact with the liquid containing the substance. Finally, the construction of the metering stopper makes it possible to vary or set as desired the delivery volume by a simple auxiliary part which is easy to manipulate.

The metering stopper according to the invention is described in greater detail with reference to some exemplary embodiments shown in the drawings, in which:

BRIEF DESCRIPTION OF THE DRAWINGS

FIG. 1 shows a side view, partly in section, of a metering stopper inserted into the neck of an upright bottle;

FIG. 2 shows a view corresponding to FIG. 1 with the bottle turned through 180°;

FIG. 3 shows an enlarged side view of an embodiment of a float;

FIG. 5 shows a side view of the metering stopper according to FIG. 4 inserted into a bottleneck;

FIG. 6 shows a view corresponding to FIG. 5 with the bottle turned through 180°, with the metering stopper being shown partly in section.

DESCRIPTION OF THE PREFERRED EMBODIMENTS

Figure 4:
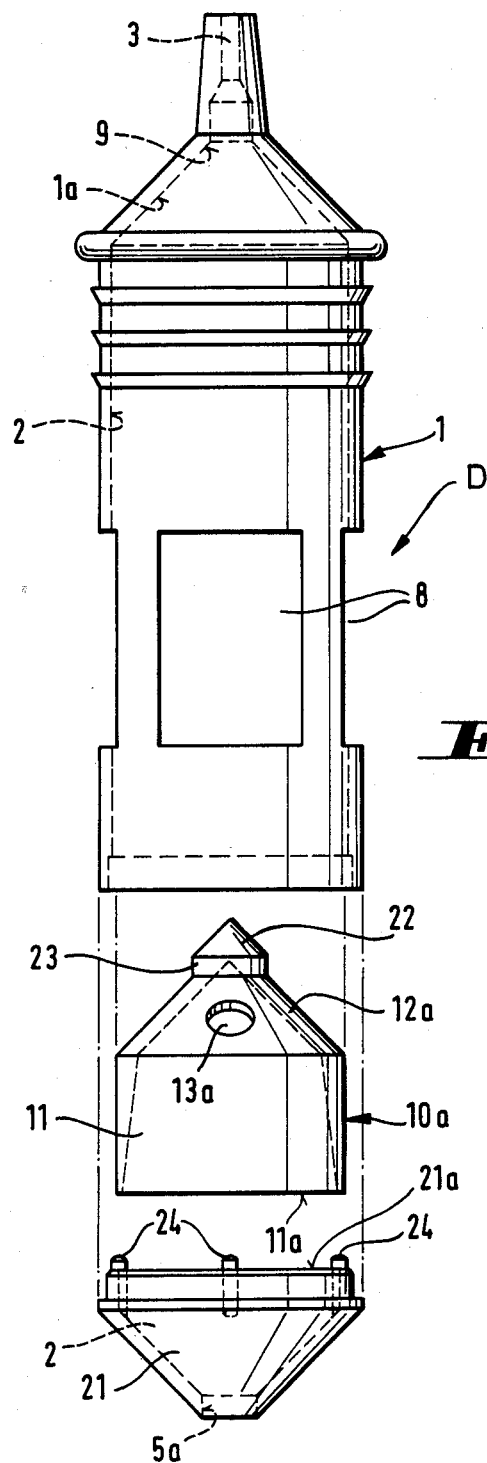
FIG. 4 shows an exploded drawing of a further embodiment of the metering stopper.

In all embodiments, the metering stopper consists of a tubular metering housing 1 which is inserted in sealing manner about halfway into the neck of a bottle F. The metering housing 1 encloses a tubular metering chamber 2 and, at its front face projecting out of the bottleneck, has an outlet bore 3 for delivering a liquid medium. Recesses 8 are cut out in the wall of the metering housing 1, which recesses 8 act as flooding openings for the liquid.

In the embodiment shown in FIGS. 1 and 2, the base 4, located inside the bottle F, of a sealing cap 6 inserted into the metering chamber 2 is provided with a vent bore 5 which leads into an air chamber 7 of the metering chamber 2. The sealing cap 6 is fitted firmly into the open end of the metering housing 1. The peripheral edge of the sealing cap 6 projects into the inside of the metering chamber 2 and the step 6a thus created acts as a limit for the displacement of the float 10.

A float 10 is inserted into the metering chamber 2, which float 10 slides along the inner wall of the metering housing 1 enclosing the metering chamber 2. The float 2 consists of a cylindrical or slightly conical part 11 with a flat base or smooth and circular peripheral edge 11a and a tapered closed cone 12 intergrally formed opposite this base. The density of the float 10 is always greater than the density of the medium to be delivered. The float 10 is therefore a hollow body open at the base and closed at the tip of the cone 12. The tip of the cone 12 is the sealing taper which is directed towards the outlet bore 3, the lower edge of which, pointing into the inside of the metering chamber 2, acts as a sealing or valve seat 9 for the sealing taper of the float 10. The lower edge of the float 10 sits on the step 6a of the sealing cap 6. The flooding bore 13 is cut out of the wall of the cylindrical part 11 of the float 10.

The metering chamber 2 is divided by the float 10 into an air chamber 7 between the base of the float and the base 4 of the metering chamber 2 and an actual metering space between the cone 12 of the float 10 and the valve seat beneath the outlet bore 3.

The float 10 is inserted into the metering chamber 2 in such a way that, at all events, some of the recesses 8 acting as intake openings for liquid remain clear in the metering housing 1.

A further embodiment of the metering stopper is shown in FIGS. 4 to 6. The basic elements are the same as in the first embodiment described. The same components are identified with the same reference numerals.

The float 10a of this embodiment also consists of a cylindrical part 11 on which a cone 12a is integrally formed, but the tip of this cone, acting as a sealing taper 22, is offset from the cone 12a by an annular shoulder 23. The flooding bore 13a of this float 10a is cut out of the wall of the cone 12a.

The end of the metering housing 1, which end is provided with the outlet bore 3, is of conical configuration. The cone 1a thus formed on the metering housing 1 and the cone 12a of the float 10a are adapted to one another. The shoulder 23 between the sealing taper 22 and the cone 12a ensures that a small gap a is left between the outer wall of the cone 12a, the float 10a and the inner wall of the cone 1a of the metering housing 1 when the sealing taper 22 bears against the valve seat 9 at the outlet bore 3 of the metering housing 1, which gap a prevents the float 10a from adhering to the metering housing 1.

The sealing cap 21, the wall of which runs conically up to the vent bore 5a, is inserted into the open end of the metering housing 1, as in the first described embodiment. The base of the metering chamber 2 is therefore conically narrowed. The edge of the sealing cap 21, which edge projects into the inside of the metering chamber 2, also forms a step 21a here, on which protruding pins 24 are integrally formed. In the upright bottle F, the free edge 11a of the float 10a therefore sits on these pins 24, as a result of which the float 10a is prevented from adhering here too. The return of the float is therefore accelerated and there is less still liquid around the float to flow back.

Handling the metered removal of a liquid medium takes place in simple manner.

The bottle provided with the metering stopper is held with the mouth downwards, that is, with the outlet bore of the metering housing 1 downwards, whereupon the liquid can enter the metering space of the metering chamber through the recesses 8.

In the non-operative position of the float 10 or 10a, the flooding opening 13 or 13a exposes a small area in the lower part of the recesses 8 in the metering houssing 1. On account of the specific weight of the float 10 or 10a, or on account of the hollow filled with air, the float maintains buoyancy until the air in the metering chamber 2 is displaced by liquid. This "holding time" is adequate to fill the metering chamber 2 completely with liquid. The float 10 or 10a, together with the discharging liquid, sinks in the metering space only when this has taken place and liquid has displaced the air inside the float. When the front face of the metering chamber 2 is reached, the tip of the cone 12 or 12a of the float slides into the inversely conical valve seat 9 in the outlet bore 3 of the metering chamber 2 and forms a reliable seal (FIGS. 2 and 6). If the bottle F is now placed again into an upright position, the float 10 or 10a falls back downwards in the metering chamber 2 and metering can be carried out again.

Figure 7:
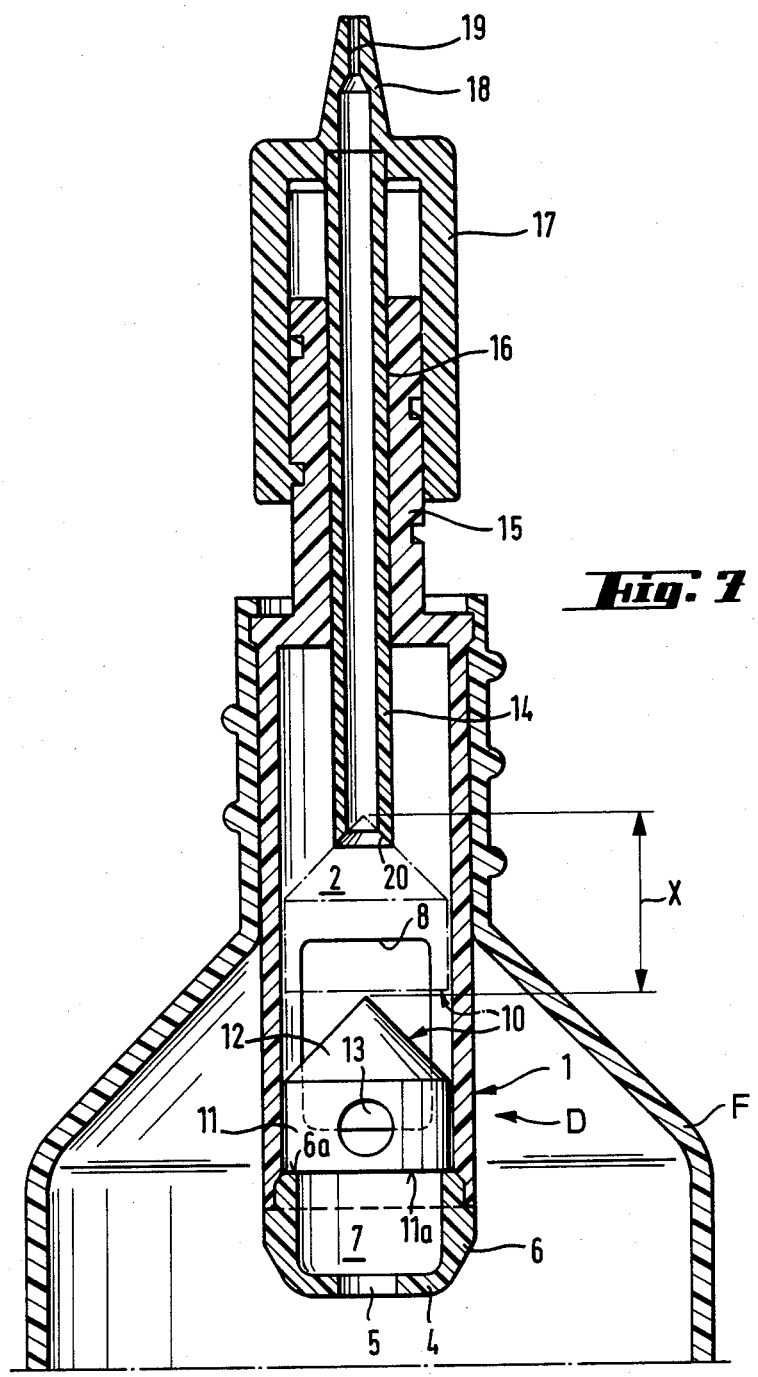
FIG. 7 shows a side view, partly in section, of a metering stopper inserted into a bottleneck and having an adjusting device.

In a further advantageous embodiment, the metering stopper D can be formed by a simple auxiliary part in such a way that the liquid quantity to be removed can be selected by adjustment. This is shown in FIG. 7 together with the first described embodiment of the metering stopper. For this purpose, instead of the outlet bore, an opening corresponding to such a bore is provided on the front-face end of the metering housing 1, through which opening is inserted a tube 14. The tube 14 is displaceably guided in an axial or outlet bore 16 of the metering chamber which is an integral extension on the front face of the metering housing 1. The free end of the tube 14, which end projects upwards out of the extension 15, is non-positively connected in the cover plate of a cap 17, the cylindrical side wall of which surrounds the outer periphery of the extension 15 and is axially displaceable on the latter, for example by an interlocking thread or in another manner. The end of the tube 17 located in the cover plate of the cap 17 leads into the outlet bore 19 for the liquid medium to be delivered, which outlet bore 19 is here provided in the cap 17. By axial displacement of the cap 17 on the extension 15 on the stopper body 1, the tube 14 is moved further into or out of the metering chamber 2, as a result of which the displacement distance X of the float 10 and therefore the liquid quantity to be delivered can be varied. At the inlet opening located in the metering chamber 2, the tube 14 has a tapered valve seat 20, with which the pointed end of the cone 12 of the float 10 comes in contact in sealing manner as soon as the metered liquid quantity is delivered. The shorter the displacement of the float 10, the smaller is the metering space and the metered liquid quantity is accordingly less.

The cap 17 connected to the tube 14 can be made as a screw cap which can be screwed on or unscrewed by turning on a corresponding external thread of the extension 15 and at the same time takes the tube 14 along with it. The liquid quantity desired in each case can be set by means of marks made visibly on the outer circumference of the extension 15. The cap 17 can also be displaced on the extension 15 in another manner.

With such a metering stopper according to the invention, it is possible, without additional manipulations, to meter liquid quantities, preset to a fixed amount, much more accurately than with known devices of this type. Numerous tests have resulted in very satisfactory metering accuracies which only deviated from normal in the delivery of residual quantities.

Thus, in the case of a delivery quantity of methylated spirit set to 13 grams, an average value of 13.23 was established in 23 cycles, the values fluctuating as a rule around 13 g with one exception of 15.6 and the residual output of 10.1 g. Setting the metered quantities to 10 grams resulted in an average value of 10.11 g in 33 cycles, in which case a maximum quantity of 10.6 g and a residual delivery of 7.2 g were measured here. The medium here was also methylated spirit.

The delivery of water at a setting of 14 grams resulted in an average value of 14.45 in 29 cycles, in which case a maximum quantity of 17.2 and a minimum quantity of 12.1 g were measured at the end of delivery.

When not being used, the outlet bore 3 or 19 is closed by a tightly seated cap (not shown).

While the invention has been particularly shown and described in reference to preferred embodiments thereof, it will be understood by those skilled in the art that changes in form and details may be made therein without departing from the spirit and scope of the invention.

We claim:

1. A metering stopper for the neck of a bottle for the metered delivery of a liquid medium, comprising: a substantially tubular metering housing which encloses a metering chamber having an outlet bore for the medium in its front surface and having recesses for the filling of the metering chamber passing through a wall of the metering housing; and a float having at least one lateral flooding bore which is inserted in the metering chamber, and wherein the density of the float is greater than that of the medium to be delivered and its end facing towards the outlet bore interacts with a valve seat allocated on the outlet bore, and wherein an open end of the metering housing and of the metering chamber, which end is located opposite the outlet bore, is closed by an inserted sealing cap which has a vent bore which is suitable for being aligned with the outlet bore of the metering housing, and wherein the float comprises a hollow body open on one side and having a cylindrical part and, integrally formed thereon, a tapered cone, the tip of the cone which fits a valve seat abutting the outlet bore as a sealing taper, and another floodlng bore through at least one wall of the cone, wherein the float has said sealing taper positioned away from said another flooding bore of said tapered cone, and wherein said sealing taper is offset from the tapered cone by an annular shoulder for preventing the float from adhering to the metering housing and for providing a circumferential gap between the float and the metering stopper.

2. The metering stopper according to claim 1, wherein the end of the metering housing has the outlet bore in a conical configuration.

3. The metering stopper according to claim 1, wherein the contour of the tapered cone of the float is adapted to the conical end of the metering housing.

4. The metering stopper according to claim 1, wherein the sealing cap inserted into the open end of the metering chamber has protruding pins on its edge, which projects beyond the inner wall of the meteing chamber and forms a step for accommodating thereon the float in order to preclude adherence of the float onto the inner wal of the metering chamber.

5. The metering stopper according to claim 1, wherein the volume of the medium to be delivered can be set by varying the displacement of the float in the metering chamber.

6. A metering stopper for the neck of a bottle for the metered delivery of a liquid medium comprising: a substantially tubular metering housing which encloses a metering chamber having an outlet bore for the medium in its front surface and having recesses for the filling of the metering chamber passing through a wall of the metering housing; and a freely moving float having at least one lateral flooding bore which is inserted in the metering chamber, and wherein the density of the float is greater than that of the medium to be delivered and its end facing towards the outlet bore interacts with a valve seat allocated on the outlet bore, and wherein an open end of the metering housing and of the metering chamber, which end is located opposite the outlet bore, is closed by an inserted sealing cap which has a vent bore which is suitable for being aligned with the outlet bore of the metering housing, and wherein the float comprises a hollow body open on one side and having a cylindrical part and, integrally formed thereon, a tapered cone, the tip of the cone which fits a valve seat abutting the outlet bore as a sealing taper, and another flooding bore through at least one wall of the cone, the valve seat defined by a tube which is pushed through the outlet bore into the metering chamber and can be displaced therein, and wherein the tube has a free end and an end projecting into the metering chamber which is made with a tapered valve seat for the cone of the float.

* * * * *